(12) United States Patent
Lei et al.

(10) Patent No.: US 10,503,518 B2
(45) Date of Patent: Dec. 10, 2019

(54) INITIALIZING HARDWARE COMPONENTS USING PARALLEL DRIVER LOADING AND SERIAL ACCESS GRANTING

(71) Applicant: Microsoft Technology Licensing, LLC, Redmond, WA (US)

(72) Inventors: Maria Cheng Lei, Bellevue, WA (US); Vishal Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 15/730,607

(22) Filed: Oct. 11, 2017

(65) Prior Publication Data

US 2019/0108039 A1    Apr. 11, 2019

(51) Int. Cl.
| | |
|---|---|
| *G06F 9/4401* | (2018.01) |
| *G06F 13/10* | (2006.01) |
| *G06F 9/455* | (2018.01) |
| *G06F 9/54* | (2006.01) |
| *G06F 9/445* | (2018.01) |

(52) U.S. Cl.
CPC .......... *G06F 9/4411* (2013.01); *G06F 9/4403* (2013.01); *G06F 9/4406* (2013.01); *G06F 13/105* (2013.01); *G06F 9/4401* (2013.01); *G06F 9/445* (2013.01); *G06F 9/54* (2013.01); *G06F 9/542* (2013.01); *G06F 2009/45579* (2013.01)

(58) Field of Classification Search
CPC .... G06F 9/4411; G06F 9/4403; G06F 9/4406; G06F 13/105; G06F 2009/45579; G06F 9/4401; G06F 9/542; G06F 9/445; G06F 9/54

USPC .......... 713/1, 2, 100; 719/321, 312, 313, 318
See application file for complete search history.

(56) References Cited

U.S. PATENT DOCUMENTS

| | | | |
|---|---|---|---|
| 6,453,375 B1 * | 9/2002 | Derr ................... | G06F 13/102 710/200 |
| 9,274,804 B2 * | 3/2016 | Gillespie ............. | G06F 9/4401 |

(Continued)

FOREIGN PATENT DOCUMENTS

GB           2452735 A       3/2009

OTHER PUBLICATIONS

"International Search Report and Written Opinion Issued in PCT Application No. PCT/US18/054272", dated Feb. 12, 2019, 9 Pages.

(Continued)

*Primary Examiner* — Ji H Bae
(74) *Attorney, Agent, or Firm* — Wade IP Law LLC

(57) ABSTRACT

Techniques are described herein that are capable of initializing hardware components by loading drivers in parallel and granting the drivers access to the hardware components serially. For instance, a controller may serve as an intermediary between the drivers and the hardware components to synchronize access of the drivers to the respective hardware components. The controller may include software and hardware. The software may program the hardware to grant the drivers access to the respective hardware components serially based at least in part on an event that is capable of being associated with one driver at a time. Accordingly, access of the drivers to the respective hardware components may be granted serially, even though the drivers have been loaded in parallel.

20 Claims, 7 Drawing Sheets

(56) References Cited

U.S. PATENT DOCUMENTS

| | | | |
|---|---|---|---|
| 2004/0268108 A1* | 12/2004 | Chen | G06F 9/4405 |
| | | | 713/1 |
| 2008/0244551 A1 | 10/2008 | Jung et al. | |
| 2009/0251727 A1* | 10/2009 | Yokomizo | G06F 9/4411 |
| | | | 358/1.15 |
| 2018/0293117 A1* | 10/2018 | Peng | G06F 9/4406 |

OTHER PUBLICATIONS

Tedhudek, "Specifying Driver Load Order—Windows Drivers", Retrieved From: https://docs.microsoft.com/en-us/windows-hardware/drivers/install/specifying-driver-load-order, Apr. 20, 2017, 4 Pages.

\* cited by examiner

INITIALIZING HARDWARE COMPONENTS USING PARALLEL DRIVER LOADING AND SERIAL ACCESS GRANTING

BACKGROUND

When a computing device (e.g., a desktop computer, tablet computer, personal digital assistant, or mobile phone) is initialized (a.k.a. booted up), device drivers access corresponding hardware components to initialize the hardware components. For instance, the device drivers may serve as software interfaces to the hardware components to enable programs (e.g., an operating system) to access functionality of the hardware components. The device drivers traditionally access the corresponding hardware components serially due to hardware limitations of the computing device. One common technique for serializing access to hardware components is to have static load-time dependency among the various software drivers. For instance, if driver A has a dependency on driver B, driver B will not be loaded until driver A loads successfully. Static load-time dependency therefore causes drivers to be loaded serially. However, if static load-time dependency is used and a dependent driver fails to load correctly, the remaining dependent drivers typically are not loaded.

SUMMARY

Various approaches are described herein for, among other things, initializing hardware components by loading drivers in parallel and granting the drivers access to the hardware components serially. Examples of a hardware component include but are not limited to a camera (e.g., camera sensor), a printer, a gyroscope, an ambient light sensor (ALS), an accelerometer, a magnometer, a speaker, and a microphone. A controller may serve as an intermediary between the drivers and the hardware components to synchronize access of the drivers to the respective hardware components. The controller may include software and hardware, and the software may program the hardware to grant the drivers access to the respective hardware components serially based on (e.g., based at least in part on) an event (e.g., a named event) that is capable of being associated with one driver at a time. For example, the controller may grant a first driver access to a first hardware component at a first time instance (e.g., based on the event being associated with the first driver at the first time instance); the controller may grant a second driver access to a second hardware component at a second time instance that follows the first time instance (e.g., based on the event being associated with the second driver at the second time instance); the controller may grant a third driver access to a third hardware component at a third time instance that follows the second time instance (e.g., based on the event being associated with the third driver at the third time instance), and so on. Accordingly, access of the drivers to the respective hardware components may be granted serially, even though the drivers have been loaded in parallel.

In an example approach, multiple software drivers of a computing device are loaded in parallel. The software drivers correspond to respective hardware components of the computing device. Access of the software drivers to the respective hardware components is controlled by serially granting the software drivers access to the respective hardware components. For example, an operating system of the computing device may create an event (e.g., a common sync object) to serialize the access of the software drivers to the respective hardware components. In another example, an operating system may create multiple events (e.g., sync objects) to control access of respective subsets of software drivers to respective subsets of hardware components. For instance, a first event may be used to serialize access of a first subset of software drivers to a first subset of hardware components; a second event may be used to serialize access of a second subset of software drivers to a second subset of hardware components, and so on. Static load-time dependency may be used to load some software drivers serially, so long as other software drivers are loaded in parallel.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
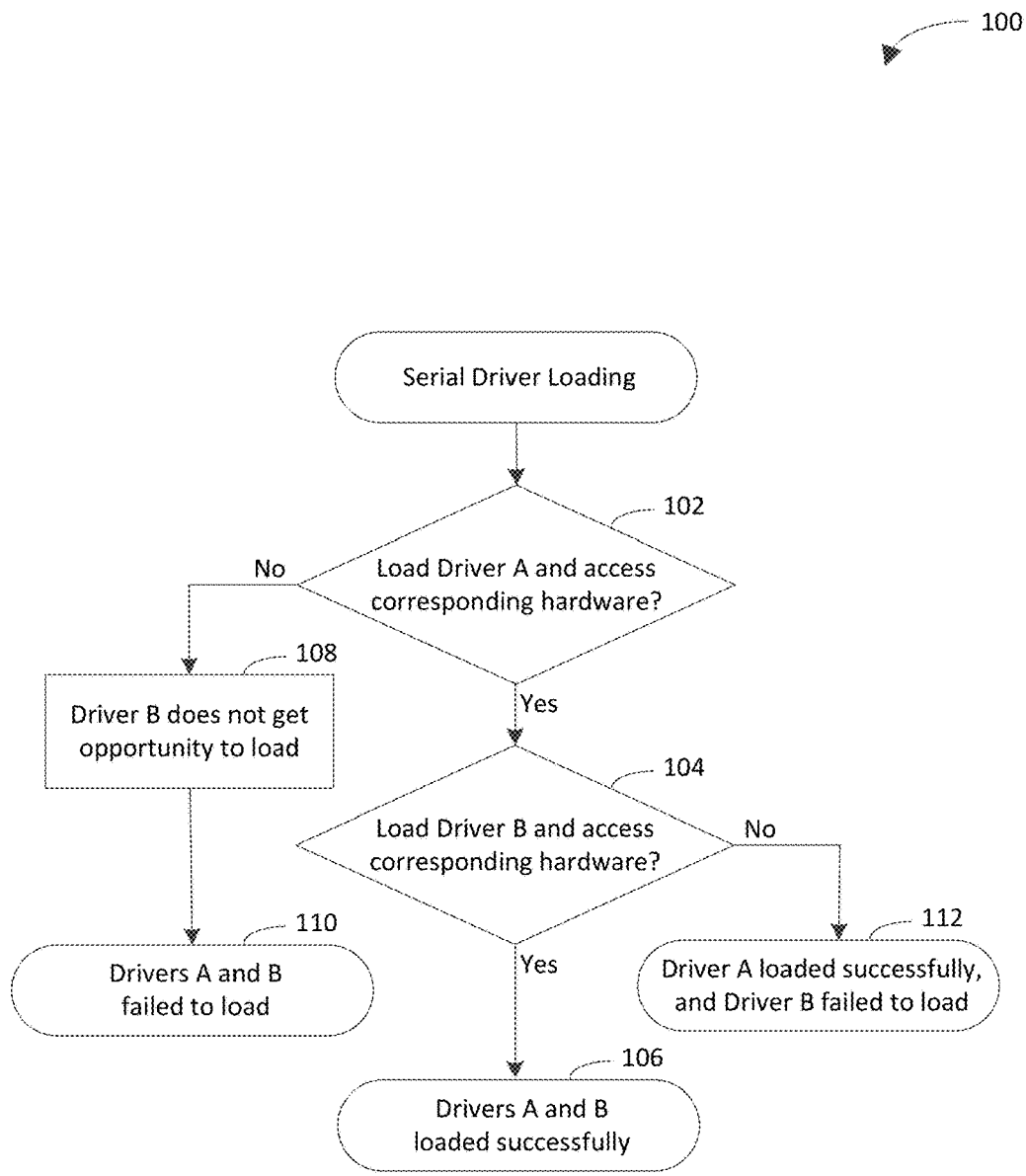
FIG. 1 depicts a flowchart of an example method for loading drivers serially.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required. For instance, a statement that a first time instance precedes a second time instance or that the second time instance follows the first time instance indicates a required order of the first and second time instances.

II. Example Embodiments

Example embodiments described herein are capable of initializing hardware components by loading drivers in parallel and granting the drivers access to the hardware components serially. For instance, drivers (especially drivers corresponding to hardware components of the same hardware component type) traditionally are loaded in series using a static load-time dependency. Static load-time dependency dictates an order in which drivers may be loaded. The example embodiments are capable of loading such drivers in parallel to remove the static load-time dependency. Examples of a hardware component (or hardware component type) include but are not limited to a camera (e.g., camera sensor), a printer, a gyroscope, an ambient light sensor (ALS), an accelerometer, a magnetometer, a speaker, and a microphone. A controller may serve as an intermediary between the drivers and the hardware components to synchronize access of the drivers to the respective hardware components. The controller may include software and hardware, and the software may program the hardware to grant the drivers access to the respective hardware components serially based on (e.g., based at least in part on) an event (e.g., a named event) that is capable of being associated with one driver at a time.

An event is an action or occurrence that is capable of being recognized by software. The software may trigger the event into an event loop, as will be understood by persons of skill in the relevant art. An event loop is a programming construct that waits for and dispatches events or messages in a program. For example, the event loop may make a request to an event provider, which may block the request until an event has arrived. In accordance with this example, the event loop may call an event handler to dispatch the event. The event handler may dispatch the event to (e.g., associate the event with) the drivers serially. For instance, each of the drivers may be granted access to its corresponding hardware component based on the event being dispatched to that driver. The event may be a named event, meaning that the event has a name that is made available to entities that may attempt to use the event. For instance, naming the event may facilitate sharing the event across the drivers.

For example, the controller may grant a first driver access to a first hardware component at a first time instance (e.g., based on the event being associated with the first driver at the first time instance); the controller may grant a second driver access to a second hardware component at a second time instance that follows the first time instance (e.g., based on the event being associated with the second driver at the second time instance); the controller may grant a third driver access to a third hardware component at a third time instance that follows the second time instance (e.g., based on the event being associated with the third driver at the third time instance), and so on. Accordingly, access of the drivers to the respective hardware components may be granted serially, even though the drivers have been loaded in parallel.

Example techniques described herein have a variety of benefits as compared to conventional techniques for initializing hardware components. For instance, the example techniques may be capable of serializing access of software drivers to hardware components, even though the software drivers are loaded in parallel. If a software driver fails to load correctly, the example techniques nevertheless may be capable of loading other software drivers thereafter. Accordingly, the example techniques may increase reliability of the computing device on which the hardware components are initialized, as compared to conventional techniques. For instance, hardware components associated with those other software drivers may be usable (e.g., by an end user or a test engineer) even though the hardware component whose software driver failed to load is not usable.

The example techniques may reduce an amount of time and/or resources (e.g., processor, memory) that are consumed to initialize hardware components. For instance, loading software drivers in parallel may take less time, reduce processor utilization, and/or reduce memory utilization, as compared to loading the software drivers in series. The example techniques may increase efficiency of the computing system on which the hardware components are initialized. The example techniques may initialize hardware devices faster than conventional techniques.

Figure 2:
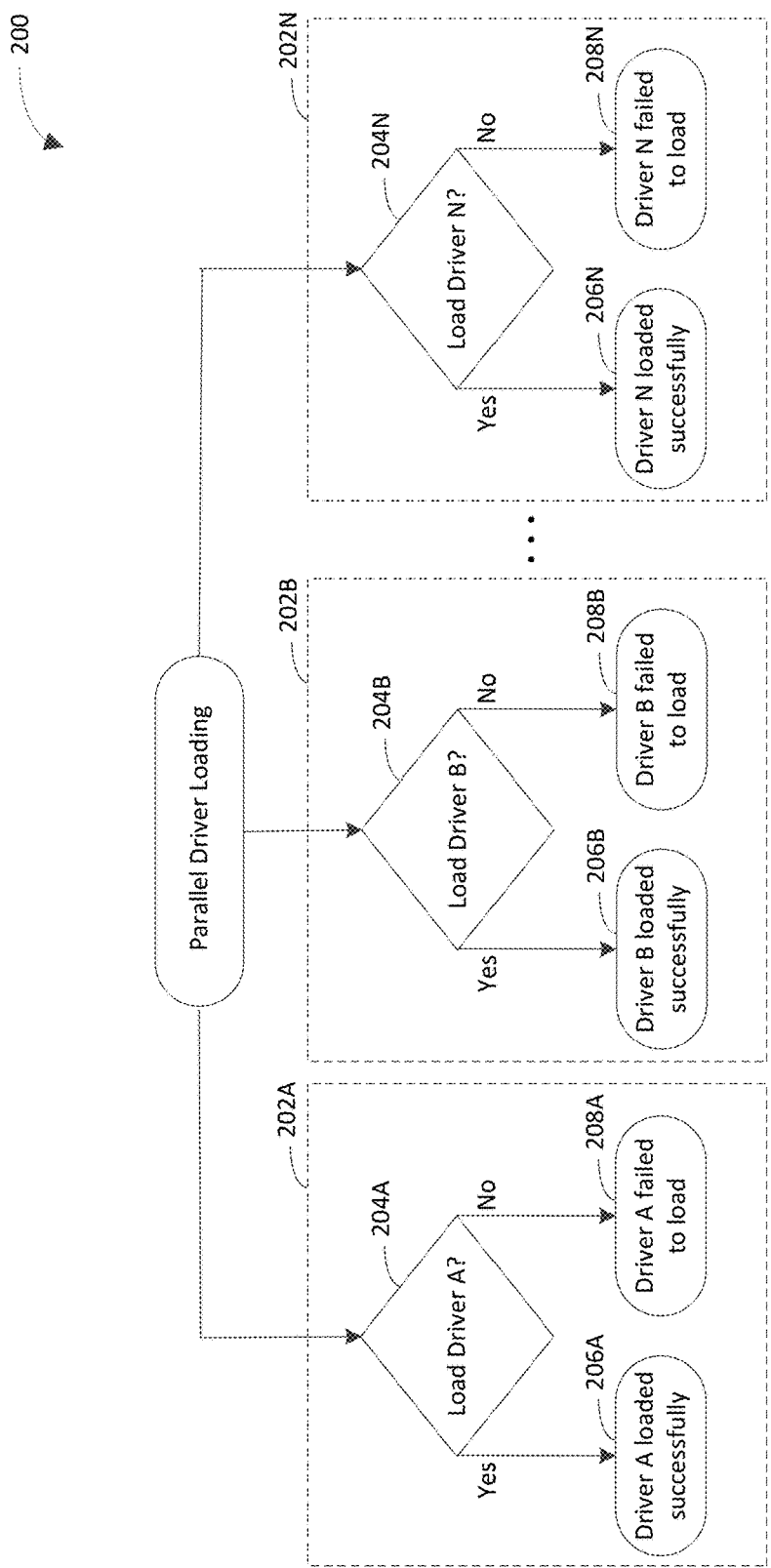
FIG. 2 depicts a flowchart of an example method for loading drivers in parallel in accordance with an embodiment.

A distinction between serial driver loading and parallel driver loading will be described with reference to FIGS. 1 and 2. For instance, FIG. 1 depicts a flowchart 100 of an example method for loading drivers serially using static load-time dependency among software drivers; whereas, FIG. 2 depicts a flowchart 200 of an example method for loading drivers in parallel in accordance with an embodiment. The methods of flowcharts 100 and 200 are described with reference to two drivers (i.e., Driver A and Driver B) for non-limiting illustrative purposes. It will be recognized that the methods are applicable to any suitable number of drivers (e.g., 2, 3, 4, or 5 drivers).

As shown in FIG. 1, the method of flowchart 100 starts at step 102. In step 102, a determination is made whether Driver A is loaded and its corresponding hardware is accessed. If so, control flows to step 104. Otherwise, control flows to step 108.

At step 104, a determination is made whether Driver B is loaded and its corresponding hardware is accessed. If so, control flows to step 106. Otherwise, control flows to step 112.

At step 106, the method of flowchart 100 ends with Drivers A and B being successfully loaded.

At step 108, Driver B does not get an opportunity to load, and flow continues to step 110.

At step 110, the flowchart 100 ends with Drivers A and B failing to load.

At step 112, the flowchart 100 ends with Driver A being successfully loaded and Driver B failing to load.

As shown in FIG. 2, the method of flowchart 200 includes branches 202A-202N, which are performed in parallel. Branch 202A starts with step 204A. At step 204A, a determination is made whether Driver A is loaded. If so, control flows to step 206A. Otherwise, control flows to step 208A.

At step 206A, branch 202A ends with Driver A being successfully loaded.

At step 208A, branch 202A ends with Driver A failing to load.

Branch 202B starts with step 204B. At step 204B, a determination is made whether Driver B is loaded. If so, control flows to step 206B. Otherwise, control flows to step 208B.

At step 206B, branch 202B ends with Driver B being successfully loaded.

At step 208B, branch 202B ends with Driver B failing to load.

Each branch of the method is performed in a similar manner. For instance, branch 202N starts with step 204N. At step 204N, a determination is made whether Driver N is loaded. If so, control flows to step 206N. Otherwise, control flows to step 208N.

At step 206N, branch 202N ends with Driver N being successfully loaded.

At step 208N, branch 202N ends with Driver N failing to load.

Figure 3:
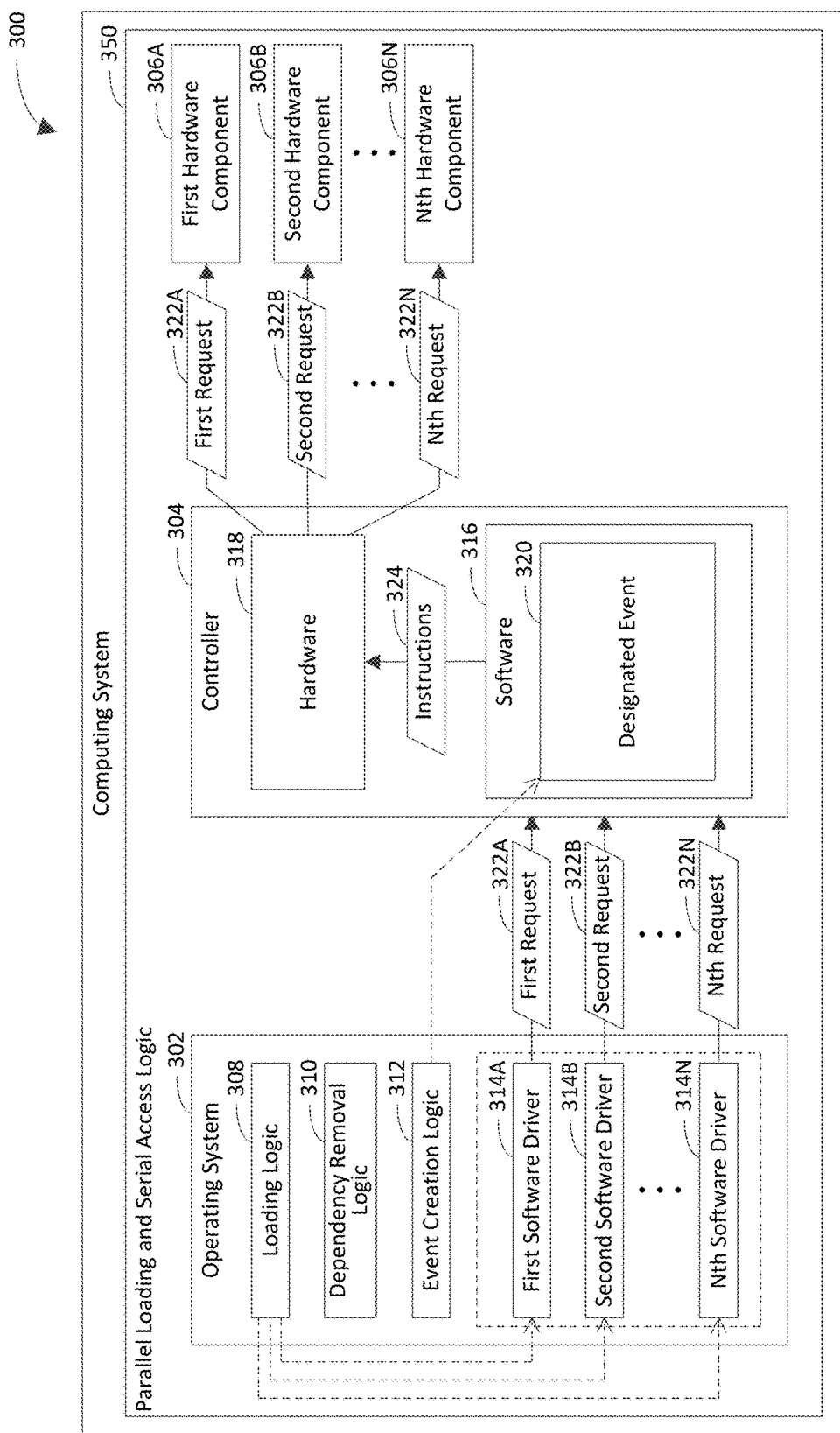
FIGS. 3 and 4 are block diagrams of example computing systems in accordance with embodiments.

FIG. 3 is a block diagram of an example computing system 300 in accordance with an embodiment. The computing system 300 includes one or more processing systems. An example of a processing system is a system that includes at least one processor that is capable of manipulating data in accordance with a set of instructions. For instance, a processing system may be a computer (e.g., a desktop computer, a laptop computer, a tablet computer, a wearable computer such as a smart watch or a head-mounted computer), a personal digital assistant, a cellular telephone, etc.

As shown in FIG. 3, the computing system 300 includes parallel loading and serial access logic 350. The parallel loading and serial access logic 350 is configured to initialize hardware components using parallel driver loading and serial access granting. The parallel loading and serial access logic 350 includes an operating system 302, a controller 304, and a plurality of hardware components 306A-306N. The operating system 302 performs operations which may include but are not limited to managing computer hardware and software resources and providing services for computer programs that run on the computing system 300. Examples of an operating system include but are not limited to Berkeley Software Distribution™ (BSD), developed and distributed by the Computer Systems Research Group (CSRG) of the University of California, Berkeley, or descendants thereof; Linux developed and distributed under the GNU Project; iOS™ developed and distributed by Apple Inc., Microsoft Windows® developed and distributed by Microsoft Corporation; and UNIX™ developed and distributed by AT&T.

The operating system 302 includes loading logic (a.k.a. loader) 308, dependency removal logic 310, event creation logic 312, and a plurality of software drivers 314A-314N. The loading logic 308 is configured to load the software drivers 314A-314N in parallel. For example, the loading logic 308 may read the contents of executable files that define the software drivers 314A-314N into memory of the computing system 300 at substantially the same time. In accordance with this example, the loading logic 308 may prepare the software drivers 314A-314N for execution. It will be recognized that once the software drivers 314A-314N are loaded, the operating system 302 may start the software drivers 314A-314N by passing control to the loaded software drivers 314A-314N.

If the operating system 302 supports virtual memory, the loading logic 308 need not necessarily copy the contents of the executable files into memory. For example, the loading logic 308 may load the software drivers 314A-314N by declaring to a virtual memory subsystem that a mapping exists between regions of memory that are allocated to contain the code of the running software drivers 314-314N and the contents of the executable files. In accordance with this example, the virtual memory subsystem may be notified that pages with those regions of memory are to be filled on demand if and when execution of the software drivers 314A-314N reaches those regions. Accordingly, parts of the code may not be copied into memory until those parts are used, and parts of the code that are not used may not be copied into memory at all.

The loading logic 308 may be configured to determine whether software drivers (e.g., software drivers 314A-314N) have an explicit dependency. Software drivers are deemed to have an explicit dependency if, for each of the software drivers, the respective software driver has an explicit dependency on one or more of the other software drivers and/or one or more of the other software drivers have an explicit dependency on the respective software driver. In one example, loading logic 308 may be configured to determine whether software drivers are to be loaded in parallel or in series based on whether the software drivers have an explicit dependency. If the software drivers have an explicit dependency, the loading logic 308 may load the software drivers in series (e.g., using a static load-time dependency). If the software drivers do not have an explicit dependency, the loading logic 308 may load the software drivers in parallel. Accordingly, the loading logic 308 may load the software drivers 314A-314N in parallel in response to (e.g., based on) a determination that the software drivers 314A-314N do not have an explicit dependency.

It should be noted that an explicit dependency may exist based on any suitable condition(s). For example, an explicit dependency may exist between hardware components of a same hardware component type based on such condition(s). In an aspect of this example, assume for non-limiting, illustrative purposes that the hardware components include a master camera and a slave camera. Further assume that a condition specifies that if the master camera fails to load, the slave camera is not to be loaded. In accordance with this aspect, an explicit dependency exists between the master camera and the slave camera based on the condition.

In another example, an explicit dependency may exist between hardware components of different component types based on such condition(s). In an aspect of this example, assume for non-limiting, illustrative purposes that the hardware components include a voltage regulator and a camera. Further assume that a condition specifies that if the voltage regulator fails to load, the camera is not to be loaded. In accordance with this aspect, an explicit dependency exists between the voltage regulator and the camera based on the condition.

The dependency removal logic 310 is configured to remove static load-time dependency from software drivers (e.g., software drivers 314A-314N). Static load-time dependency dictates an order in which software drivers may be loaded. For example, if driver A has a static load-time dependency on driver B, driver B cannot be loaded until driver A loads successfully. In accordance with this example, if driver B has a static load-time dependency on driver C, driver C cannot be loaded until driver B loads successfully. The removal of the static load-time dependency enables the software drivers to be loaded in any suitable order. For instance, some or all of the software drivers may be loaded in parallel if those software drivers do not have static load-time dependency.

The event creation logic 312 creates a designated event 320 (e.g., a common sync object) to facilitate serially granting the software drivers 314A-314N access to the respective hardware components 306A-306N. The designated event 320 may be a named event so that the designated event 320 may be passed among (e.g., used by) the software drivers 314A-314N one at a time, though the example embodiments are not limited in this respect. For example, possession (e.g., use) of the designated event 320 may give the software driver that has possession the ability to communicate with the hardware component with which the software driver is associated. In accordance with this example, each of the other software drivers may not be allowed to communicate with its associated hardware component until that software driver possesses the designated event 320. In further accordance with this example, once the designated event 320 is passed from a software driver to another software driver, the software driver from which the designated event 320 is passed may not be able to access its associated hardware component again until the software driver regains possession of the designated event 320.

The designated event 320 may have an available state and an unavailable state. The unavailable state indicates that the designated event 320 is assigned to (e.g., being used by) one of the software drivers 314A-314N. The available state indicates that the designated event 320 is not assigned to (e.g., not being used by) any of the software drivers 314A-314N. When the event creation logic 312 creates the designated event 320, the event creation logic 312 may signal the designated event 320, thereby setting the designated event 320 to be in the available state. Whichever software driver is temporally first to gain possession of the designated event 320 is able to communicate with its associated hardware component so long as the designated event 320 remains in the possession of that software driver. The event creation logic 312 may set the designated event 320 to the unavailable state while the designated event 320 is in the possession of the temporally first software driver. For instance, setting the designated event 320 to the unavailable state while the designated event 320 is in the possession of the temporally first software driver may effectively lock the controller 304 so that the controller 304 is allowed to communicate with the temporally first software driver but not the other software drivers so long as the temporally first software driver remains in possession of the designated event 320.

When the temporally first software driver is finished communicating with its associated hardware component (e.g., when the temporally first software driver releases the designated event 320), the event creation logic 312 may again signal the designated event 320 to indicate that the designated event 320 is again available. Whichever software driver is next to gain possession of the designated event 320 is able to communicate with its associated hardware component so long as the designated event 320 remains in the possession of that software driver. The event creation logic 312 may set the designated event 320 to the unavailable state again while this software driver has possible of the designated event 320. For instance, setting the designated event 320 to the unavailable state again may effectively lock the controller 304 again so that the controller 304 is allowed to communicate with the software driver that has possession of the designated event 320 but not the other software drivers so long as the software driver that has possession of the designated event 320 remains in possession of the designated event 320.

When the software driver that has possession of the designated event 320 is finished communicating with its associated hardware component, the event creation logic 312 may again signal the designated event 320 to indicate that the designated event 320 is again available. This process may repeat until all of the software drivers 314A-314N have communicated with their respective hardware components 306A-306N (or have been given an opportunity to do so through possession of the designated event 320).

The software drivers 314A-314N generate respective requests 322A-322N in response to the respective software drivers 314A-314N being loaded. For instance, loading of the first software driver 314A may trigger the first software driver 314A to generate the first request 322A; loading of the second software driver 314B may trigger the second software driver 314B to generate the second request 322B, and so on. Because the software drivers 314A-314N are loaded in parallel, the software drivers 314A-314N may generate the requests 322A-322N at substantially the same time, though the scope of the example embodiments is not limited in this respect. The requests 322A-322N request initiation of communication with the respective hardware components 306A-306N. Each of the software drivers 314A-314N may be a self-contained software entity.

The controller 304 is configured to control access of the software drivers 314A-314N to the respective hardware components 306A-306N. For example, the controller 304 may serially grant access of the software drivers 314A-314N to the respective hardware components 306A-306N. In accordance with this example, the controller 304 may serially provide the requests 322A-322N to the respective hardware components 306A-306N.

The controller 304 includes software 316 and hardware 318. The software 316 programs the hardware 318 to cause the hardware 318 to serially provide the requests 322A-322N to the respective hardware components 306A-306N. For example, the software 316 may program the hardware 318 based on the designated event 320. In accordance with this example, the software 316 may program the hardware 318 to provide the requests 322A-322N to the respective hardware components 306A-306N as the designated event 320 is dispatched to the respective software drivers 314A-314N. For instance, the software 316 may program the hardware 318 to provide the first request 322A to the first hardware component 306A while the designated event 320 is dispatched to the first software driver 314A; the software 316 may program the hardware 318 to provide the second request 322B to the second hardware component 306B while the designated event 320 is dispatched to the second software driver 314B, and so on. The software 316 generates instructions 324 to program the hardware 318. For example, the instructions 324 may indicate the order in which the requests 322A-322N are to be provided to the respective hardware components 306A-306N. In accordance with this example, the order may be the same as the order in which the designated event 320 is dispatched to the software drivers 314A-314N.

The hardware 318 serially provides the requests 322A-322N to the respective hardware components 306A-306N in accordance with the instructions 324 that are received from the software 316. For instance, the hardware 318 may provide the requests 322A-322N to the respective hardware components 306A-306N in the order that is indicated by the instructions 324.

In an example embodiment, the hardware 318 is capable of communicating with a single hardware component at a time. In accordance with this embodiment, use of the designated event 320 by the controller 304 enables the hardware 318 to communicate with the hardware components 306A-306N serially, even though the software drivers 314A-314N are loaded in parallel.

It will be recognized that the computing system 300 may not include one or more of the components shown therein. Furthermore, the computing system 300 may include components in addition to or in lieu of the components shown therein. For instance, a single, common controller 304 is shown in FIG. 3 for purposes of illustration and is not intended to be limiting. It will be recognized that any suitable number of controllers may be utilized to control access to respective subsets of hardware components.

Figure 4:
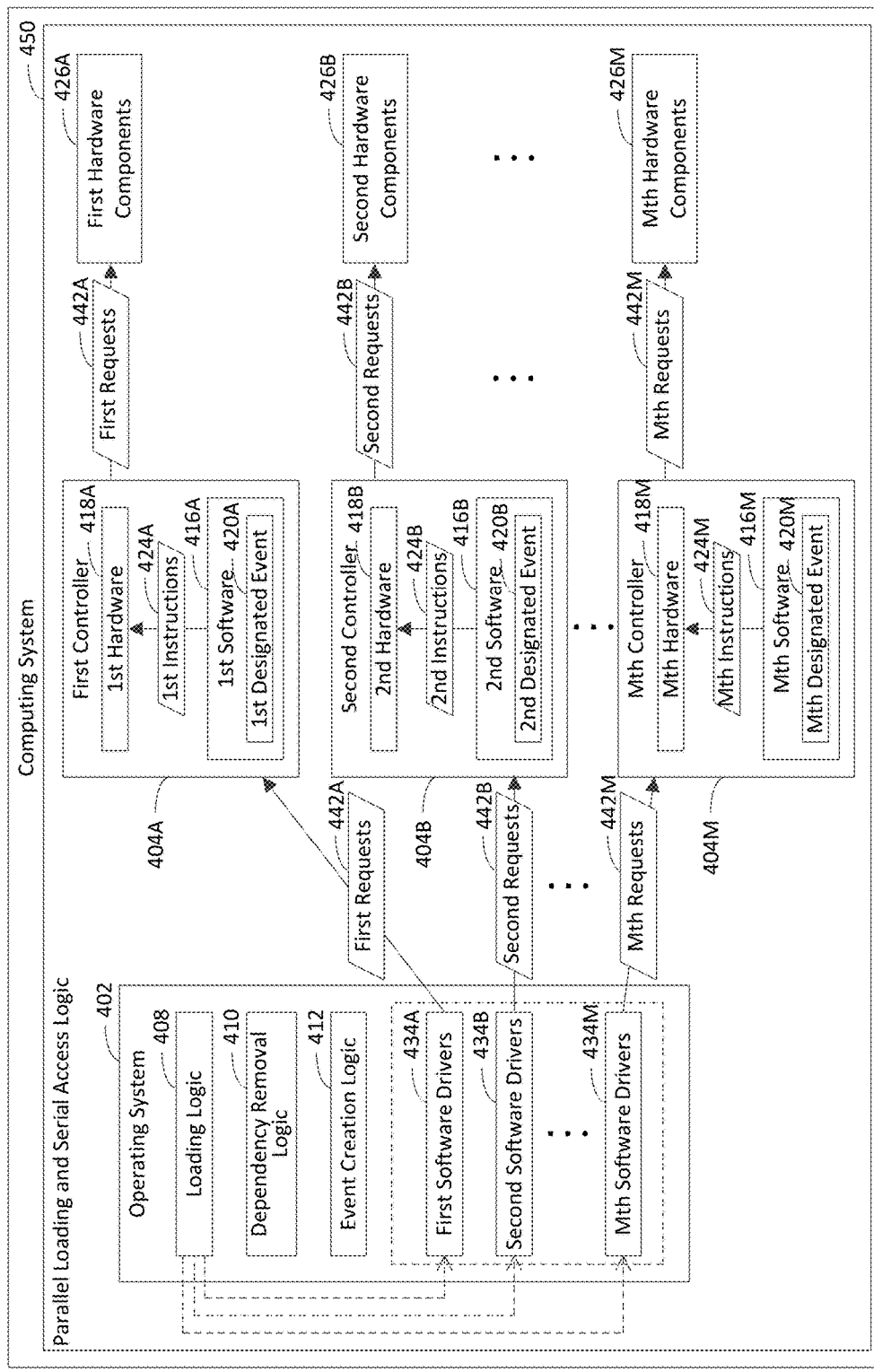

FIG. 4 is a block diagram of another example computing system 400 in accordance with an embodiment. The computing system 400 includes one or more processing systems. As shown in FIG. 4, the computing system 400 includes parallel loading and serial access logic 450. The parallel loading and serial access logic 450 is configured to initialize hardware components using parallel driver loading and serial access granting. The parallel loading and serial access logic 450 includes an operating system 402, a plurality of controllers 404A-404M, and multiple pluralities of hardware components 426A-426M. The operating system 402 includes loading logic 408, dependency removal logic 410, event creation logic 412, and multiple pluralities of software drivers 434A-434M. The operating system 402 is operable in a manner similar to the operating system 302 described above with reference to FIG. 3. For instance, the loading logic 408, the dependency removal logic 410, and the event creation logic 412 are operable in a manner similar to the loading logic 308, the dependency removal logic 310, and the event creation logic 312 described above with reference to FIG. 3.

The loading logic 402 is configured to load each of the pluralities of software drivers 434A-434M in parallel. For instance, the loading logic 402 loads the first software drivers 434A in parallel; the loading logic 402 loads the second software drivers 434B in parallel, and so on. It will be recognized that the loading logic 408 need not necessarily load any of the pluralities of software drivers 434A-434M in parallel with others. For example, the first software drivers 434A need not necessarily be loaded in parallel with the second software drivers 434B. In another example, the second software drivers 434B need not necessarily be loaded in parallel with the Mth software drivers 434M. It will be further recognized that any two of more of the pluralities of software drivers 434A-434M may be loaded in parallel. For instance, the first software drivers 434A may be loaded in parallel with the second software drivers 434B, and/or the second software drivers 434B may be loaded in parallel with the Mth software drivers 434M.

The dependency removal logic 410 is configured to selectively remove static load-time dependency from one or more (e.g., all) of the pluralities of software drivers 434A-434M. For example, the dependency removal logic 410 may remove static load-time dependency from the first software drivers 434A and not from the second software drivers 434B. In another example, the dependency removal logic 410 may remove a first static load-time dependency from the first software drivers 434A and a second static load-time dependency from the second software drivers 434B.

The event creation logic 412 creates designated events (e.g., sync objects) 420A-420M. The first designated event 420A may enable one of the first software drivers 434A to communicate with its associated hardware component among the first hardware components 426A at a time. The second designated event 420B may enable one of the second software drivers 434B to communicate with its associated hardware component among the second hardware components 426A at a time, and so on.

Each plurality of software drivers 434A-434M is operable in a manner similar to the plurality of software drivers 314A-314N described above with reference to FIG. 3. For example, the pluralities of software drivers 434A-434M generate respective pluralities of requests 442A-44M. In accordance with this example, the first software drivers 434A generate respective first requests 442A in response to the respective first software drivers 434A being loaded; the second software drivers 434B generate respective second requests 442B in response to the respective second software drivers 434B being loaded, and so on.

Each of the controllers 404A-404M is operable in a manner similar to the controller 304 described above with reference to FIG. 3. For instance, the first controller 404A is configured to control access of the first software drivers 434A to the respective first hardware components 426A; the second controller 404B is configured to control access of the second software drivers 434B to the respective second hardware components 426B, and so on. For example, the first controller 404A may serially grant access of the first software drivers 434A to the respective first hardware components 426A; the second controller 404B may serially grant access of the second software drivers 434B to the respective second hardware components 426B, and so on. In accordance with this example, the first controller 404A may serially provide the first requests 442A to the respective first hardware components 426A; the second controller 404B may serially provide the second requests 442B to the respective second hardware components 426B, and so on.

Each of the instances of software 416A-416M is operable in a manner similar to the software 316 described above with reference to FIG. 3. For example, the first software 416A may program the first hardware 418A to cause the first hardware 418A to serially provide the first requests 442A to the respective first hardware components 426A; the second software 416B may program the second hardware 418B to cause the second hardware 418B to serially provide the second requests 442B to the respective second hardware components 426B, and so on. In accordance with this example, the first software 416A may generate first instructions 424A to program the first hardware 418A using the first designated event 420A; the second software 416B may generate second instructions 424B to program the second hardware 418B using the second designated event 420B, . . . and the Mth software 416M may generate Mth instructions 424M to program the Mth hardware 418M using the Mth designated event 420M.

Each of the instances of hardware 418A-418M is operable in a manner similar to the hardware 318 described above with reference to FIG. 3. For instance, the first hardware 418A may serially provide the first requests 442A to the respective first hardware components 426A in accordance with the first instructions 424A; the second hardware 418B may serially provide the second requests 442B to the respective second hardware components 426B in accordance with the second instructions 424B, and so on.

Each plurality of hardware components 426A-426M is operable in a manner similar to the plurality of hardware components 306A-306N described above with reference to FIG. 3.

It will be recognized that the computing system 400 may not include one or more of the components shown therein. Furthermore, the computing system 400 may include components in addition to or in lieu of the components shown therein.

Each of the parallel loading and serial access logic 350 and the parallel loading and serial access logic 450 described above with reference to FIGS. 3 and 4 may be implemented in various ways to initialize hardware components by loading drivers in parallel and granting the drivers access to the hardware components serially, including being implemented in hardware, software, firmware, or any combination thereof. For example, each of the parallel loading and serial access logic 350 and the parallel loading and serial access logic 450 may be implemented at least in part as computer program code configured to be executed in one or more processors. In another example, each of the parallel loading and serial access logic 350 and the parallel loading and serial access logic 450 may be implemented at least in part as hardware logic/electrical circuitry. For instance, each of the parallel loading and serial access logic 350 and the parallel loading and serial access logic 450 may be implemented at least in part in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 5:
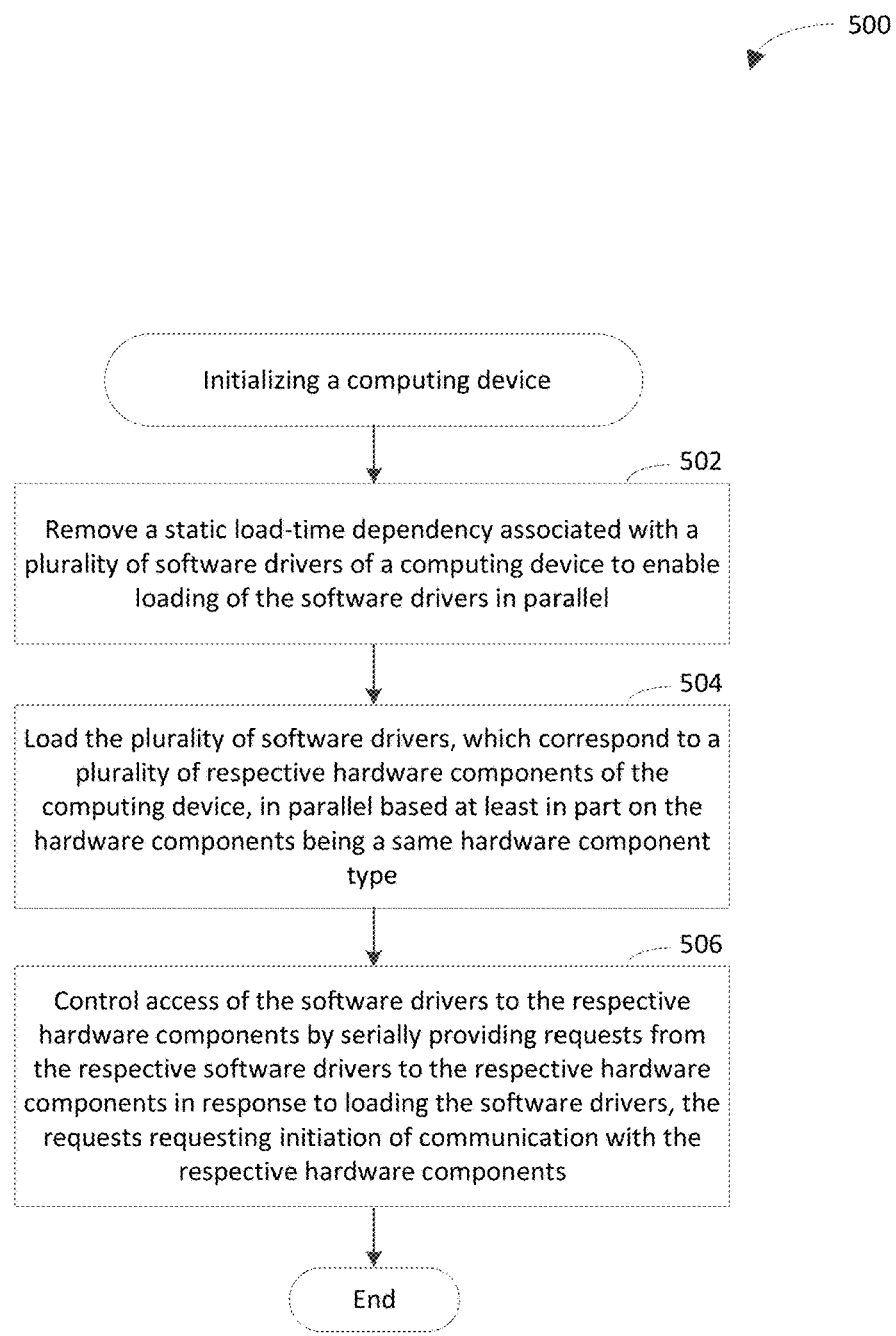
FIG. 5 depicts a flowchart of an example method for initializing a computing device in accordance with an embodiment.

FIG. 5 depicts a flowchart 500 of an example method for initializing a computing device in accordance with an embodiment. The flowchart 500 may be performed by computing system 300 or computing system 400 shown in respective FIGS. 3-4, for example. For illustrative purposes, the flowchart 500 is described with respect to the computing system 300. Further structural and operational embodiments will be apparent to persons skilled in the relevant art(s) based on the discussion regarding the flowchart 500.

As shown in FIG. 5, the method of the flowchart 500 begins at step 502. In step 502, a static load-time dependency associated with a plurality of software drivers of a computing device is removed to enable loading of the software drivers in parallel. In an example embodiment, the dependency removal logic 310 removes the static load-time dependency associated with the software drivers 314A-314N.

At step 504, the plurality of software drivers of the computing device, which correspond to a plurality of respective hardware components of the computing device, are loaded in parallel (e.g., at substantially the same time) based at least in part on the hardware components being a same hardware component type. For instance, the software drivers may be configured to control the respective hardware components. In an example implementation, the loading logic 308 loads the software drivers 314A-314N of the computing system 300, which correspond to the hardware components 306A-306N of the computing system 300, in parallel based at least in part on the hardware components 306A-306N being a same hardware component type.

At step 506, access of the software drivers to the respective hardware components is controlled by serially providing requests from the respective software drivers to the respective hardware components (e.g., despite the software drivers being loaded in parallel) in response to loading the software drivers at step 504. The requests request initiation of communication with the respective hardware components (e.g., in the context of the initialization of the computing device). Such communication may be uni-directional (e.g., from a software driver to the respective hardware component) or bi-directional (e.g., from a software driver to the respective hardware component, and vice versa). For example, the requests may be serially provided to the respective hardware components during respective successive periods of time. In accordance with this example, at least some of the requests may be throttled such that the requests are provided to the respective hardware components during the respective successive periods of time. In another example, the requests may be serially provided to the respective hardware components without using a static load-time dependency among the software drivers. In an example implementation, the controller 304 controls access of the software drivers 314A-314N to the respective hardware components 306A-306N by serially providing the requests 322A-322N from the respective software drivers 314A-314N to the respective hardware components 306A-306N in response to loading the software drivers 314A-314N. The requests 322A-322N request initiation of communication with the respective hardware components 306A-306N.

In an example embodiment, controlling the access of the software drivers at step 506 includes controlling initialization of the hardware components. In another example embodiment, step 506 includes causing communication of the software drivers with the respective hardware components to be initiated serially among the software drivers. In yet another example embodiment, step 506 includes serially granting the software drivers access to the respective hardware components for respective successive periods of time. In accordance with this embodiment, the periods of time do not overlap. In still another example embodiment, the requests are initial requests from the respective software drivers that are directed to the respective hardware components. An initial request from a software driver that is directed to a hardware component is a temporally first request that is initiated by the software driver to be received by the respective hardware component during the initialization of the computing device.

In another example embodiment, serially providing the requests to the respective hardware components includes using a controller to serially provide the requests. In accordance with this embodiment, the controller includes hardware and software. In further accordance with this embodiment, using the controller includes receiving the requests from the respective software drivers by the software. In further accordance with this embodiment, using the controller further includes programming the hardware by the software to cause the hardware to serially provide the requests to the respective hardware components.

It will be recognized that the hardware components can be of any suitable hardware component type. Examples of a hardware component type include but are not limited to a camera (e.g., camera sensor), printer, gyroscope, ambient light sensor (ALS), accelerometer, magnetometer, speaker, and microphone. In an example embodiment, the software drivers correspond to respective cameras of the computing device. In accordance with this embodiment, controlling the access at step 506 includes controlling the access of the software drivers to the respective cameras by serially providing the requests from the respective software drivers to the respective cameras.

In some example embodiments, one or more steps 502, 504, and/or 506 of flowchart 500 may not be performed. Moreover, steps in addition to or in lieu of steps 502, 504, and/or 506 may be performed. For instance, in an example embodiment, the method of flowchart 500 further includes creating a designated event to be utilized by the software drivers to facilitate initialization of the respective hardware components. The designated event is capable of being assigned to (e.g., used by) one of the software drivers at a time. In an example implementation, the event creation logic 312 creates the designated event 320 to be utilized by the software drivers 314A-314N to facilitate initialization of the respective hardware components 306A-306N. In accordance with this implementation, the designated event 320 is configured to be assigned to one of the software drivers 314A-314N at a time. In accordance with this aspect, the requests are serially provided during respective periods of time during which the designated event is assigned to (e.g., used by) the respective software drivers. In an example of this aspect, the method of flowchart 500 further includes sharing the designated event with the software drivers. For instance, the event creation logic 312 may share the designated event with the software drivers 314A-314N.

In another example embodiment, the method of flowchart 500 further includes loading a second plurality of software drivers of the computing device serially to accommodate a static load-time dependency associated with the second plurality of software drivers. For instance, the loading logic 308 or 408 may load the second plurality of software drivers serially. In an aspect of this embodiment, a first hardware component type of the plurality of hardware components and a second hardware component type of a second plurality of hardware components to which the plurality of respective software drivers correspond are the same.

A determination as to whether software drivers are to be loaded serially or in parallel may depend on whether the software drivers have an explicit dependency. The software drivers are deemed to have an explicit dependency if, for each of the software drivers, the respective software driver has an explicit dependency on one or more of the other software drivers and/or one or more of the other software drivers have an explicit dependency on the respective software driver. In the aforementioned embodiment, the second plurality of software drivers may be loaded serially based on the second plurality of software drivers having an explicit dependency. For instance, the loading logic 308 or 408 may load the second plurality of software drivers serially based on the second plurality of software drivers having the explicit dependency. In accordance with the aforementioned embodiment, the first plurality of software drivers may be loaded in parallel based on the first plurality of software drivers not having an explicit dependency. For instance, the loading logic 308 or 408 may load the first plurality of software drivers in parallel based on the first plurality of software drivers not having an explicit dependency.

In yet another example embodiment, the software drivers are first software drivers (e.g., first software drivers 434A of FIG. 4) and the hardware components are first hardware components (e.g., first hardware components 426A of FIG. 4). In accordance with this embodiment, controlling the access at step 506 includes controlling the access of the first software drivers to the respective first hardware components by a first controller. For instance, the first controller 404A shown in FIG. 4 may control access of the first software drivers 434A to the respective first hardware components 426A. In accordance with this embodiment, the method of flowchart 500 further includes loading a plurality of second software drivers of the computing device, which correspond to a plurality of respective second hardware components of the computing device, in parallel based at least in part on the plurality of second hardware components being a same second hardware component type. For instance, the loading logic 308 or 408 may load the second software drivers 434B, which correspond to the second hardware components 426B, in parallel. In further accordance with this embodiment, the method of flowchart 500 further includes controlling access of the second software drivers to the respective second hardware components, by a second controller, by serially providing second requests from the respective second software drivers to the respective second hardware components in response to the plurality of second software drivers being loaded. The second requests request initiation of communication with the respective second hardware components. For instance, the second controller 404B may control access of the second software drivers 434B to the respective second hardware components 426B by serially providing second requests 442B from the respective second software drivers 434B to the respective second hardware components 426B in response to the plurality of second software drivers 434B being loaded. The second requests 442B request initiation of communication with the respective second hardware components 426B. In further accordance with this embodiment, a request from a specified software driver that is included in the plurality of first software drivers is provided to a specified hardware component that is included in the plurality of first hardware components by the first controller in parallel with a second request from a designated software driver that is included in the plurality of second software drivers being provided to a designated hardware component that is included in the plurality of second hardware components by the second controller. For instance, the first controller 404A may provide the request from the specified software driver, which is included in the first software drivers 434A, to the specified hardware component, which is included in the first hardware components 426A, in parallel with the second controller 404B providing the second request from the designated software driver, which is included in the second software drivers 434B, to the designated hardware component, which is included in the second hardware components 426B.

In an aspect of this embodiment, the first hardware components are a first hardware component type, and the second hardware components are a second hardware component type that is different from the first hardware component type. For instance, the first hardware components 426A may be camera sensors, and the second hardware components 426B may be accelerometers.

In another aspect of this embodiment, the first software drivers are loaded in parallel with the second software drivers. For instance, the loading logic 308 or 408 may load the first software drivers 434A in parallel with the second software drivers 434B.

Figure 6:
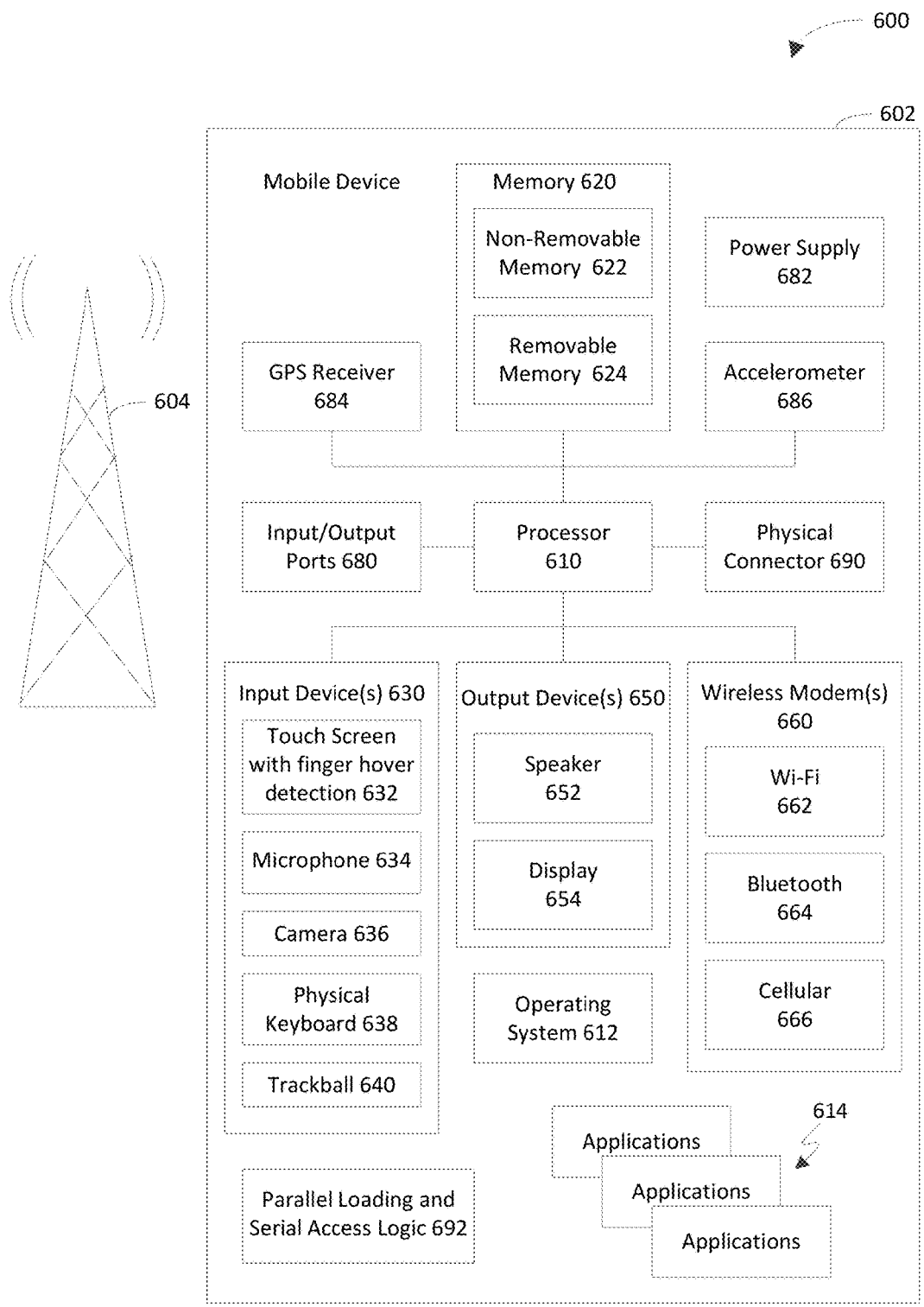
FIG. 6 is a system diagram of an exemplary mobile device in accordance with an embodiment.

FIG. 6 is a system diagram of an exemplary mobile device 600 including a variety of optional hardware and software components, shown generally as 602. Any components 602 in the mobile device may communicate with any other component, though not all connections are shown, for ease of illustration. The mobile device 600 may be any of a variety of computing devices (e.g., cell phone, smartphone, handheld computer, Personal Digital Assistant (PDA), etc.) and may allow wireless two-way communications with one or more mobile communications networks 604, such as a cellular or satellite network, or with a local area or wide area network.

The mobile device 600 may include a processor 610 (e.g., signal processor, microprocessor, ASIC, or other control and processing logic circuitry) for performing such tasks as signal coding, data processing, input/output processing, power control, and/or other functions. An operating system 612 may control the allocation and usage of the components 602 and support for one or more applications 614 (a.k.a. application programs). The applications 614 may include common mobile computing applications (e.g., email applications, calendars, contact managers, web browsers, messaging applications) and any other computing applications (e.g., word processing applications, mapping applications, media player applications).

The mobile device 600 may include memory 620. The memory 620 may include non-removable memory 622 and/or removable memory 624. The non-removable memory 622 may include RAM, ROM, flash memory, a hard disk, or other well-known memory storage technologies. The removable memory 624 may include flash memory or a Subscriber Identity Module (SIM) card, which is well known in GSM communication systems, or other well-known memory storage technologies, such as "smart cards." The memory 620 may store data and/or code for running the operating system 612 and the applications 614. Example data may include web pages, text, images, sound files, video data, or other data sets to be sent to and/or received from one or more network servers or other devices via one or more wired or wireless networks. Memory 620 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 600 may support one or more input devices 630, such as a touch screen 632, microphone 634, camera 636, physical keyboard 638 and/or trackball 640 and one or more output devices 650, such as a speaker 652 and a display 654. Touch screens, such as the touch screen 632, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 632 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches, or between 0.75 inches and 1 inch, or between 1 inch and 1.5 inches, etc.

The mobile device 600 may include parallel loading and serial access logic 692. The parallel loading and serial access logic 692 is configured to initialize hardware components (e.g., any one or more of the input device(s) 630, any one or more of the output device(s) 650, and/or any one or more of the wireless modem(s) 660) by loading drivers in parallel and granting the drivers access to the hardware components serially in accordance with any one or more of the techniques described herein.

Other possible output devices (not shown) may include piezoelectric or other haptic output devices. Some devices may serve more than one input/output function. For example, touch screen 632 and display 654 may be combined in a single input/output device. The input devices 630 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 612 or applications 614 may include speech-recognition software as part of a voice control interface that allows a user to operate the mobile device 600 via voice commands. Furthermore, the mobile device 600 may include input devices and software that allows for user interaction via a user's spatial gestures, such as detecting and interpreting gestures to provide input to a gaming application.

Wireless modem(s) 660 may be coupled to antenna(s) (not shown) and may support two-way communications between the processor 610 and external devices, as is well understood in the art. The modem(s) 660 are shown generically and may include a cellular modem 666 for communicating with the mobile communication network 604 and/or other radio-based modems (e.g., Bluetooth 664 and/or Wi-Fi 662). At least one of the wireless modem(s) 660 is typically configured for communication with one or more cellular networks, such as a GSM network for data and voice communications within a single cellular network, between cellular networks, or between the mobile device and a public switched telephone network (PSTN).

The mobile device may further include at least one input/output port 680, a power supply 682, a satellite navigation system receiver 684, such as a Global Positioning System (GPS) receiver, an accelerometer 686, and/or a physical connector 690, which may be a USB port, IEEE 1394 (FireWire) port, and/or RS-232 port. The illustrated components 602 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the parallel loading and serial access logic 350, the parallel loading and serial access logic 450, flowchart 100, flowchart 200, and/or flowchart 500 may be implemented in hardware, software, firmware, or any combination thereof. For example, any one or more of the parallel loading and serial access logic 350, the parallel loading and serial access logic 450, flowchart 100, flowchart 200, and/or flowchart 500 may be implemented at least in part as computer program code configured to be executed in one or more processors. In another example, any one or more of the parallel loading and serial access logic 350, the parallel loading and serial access logic 450, flowchart 100, flowchart 200, and/or flowchart 500 may be implemented at least in part as hardware logic/electrical circuitry. For instance, in an embodiment, one or more of the parallel loading and serial access logic 350, the parallel loading and serial access logic 450, flowchart 100, flowchart 200, and/or flowchart 500 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Example Computer System

Figure 7:
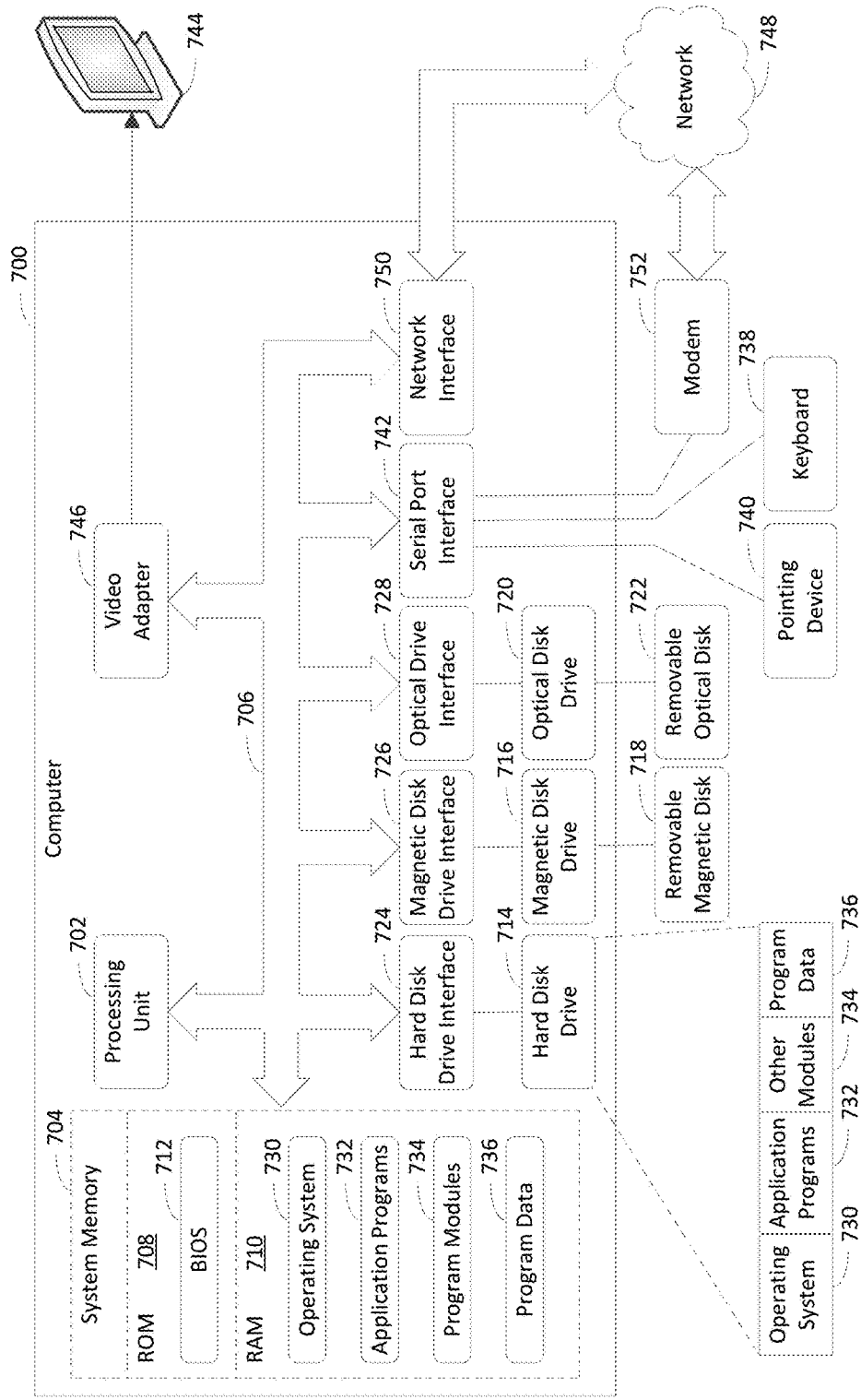
FIG. 7 depicts an example computer in which embodiments may be implemented.

FIG. 7 depicts an example computer 700 in which embodiments may be implemented. For instance, any one or more of computer systems 300 and 400 shown in respective FIGS. 3 and 4 and/or mobile device 600 shown in FIG. 6 may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing any one or more of parallel loading and serial access logic 350, operating system 302, loading logic 308, dependency removal logic 310, even creation logic 312, software drivers 314A-314N, software 316, designated event 320, parallel loading and serial access logic 450, operating system 402, loading logic 408, dependency removal logic 410, even creation logic 412, software drivers 434A-434M, software 416A-416M, designated events 420A-420M, flowchart 100 (including any step of flowchart 100), flowchart 200 (including any step of flowchart 200), and/or flowchart 500 (including any step of flowchart 500), as described herein.

A user may enter commands and information into the computer 700 through input devices such as keyboard 738 and pointing device 740. Other input devices (not shown) may include a microphone, joystick, game pad, satellite dish, scanner, touch screen, camera, accelerometer, gyroscope, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable storage medium" are used to generally refer to media (e.g., non-transitory media) such as the hard disk associated with hard disk drive 714, removable magnetic disk 718, removable optical disk 722, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer-usable medium. Such software, when executed in one or more data processing devices, causes data processing device(s) to operate as described herein. Embodiments may employ any computer-usable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Further Discussion of Some Example Embodiments

A first example system comprises a plurality of hardware components. The first example system further comprises a memory storing an operating system. The first example system further comprises one or more processors configured to execute the operating system. The operating system is configured to load a plurality of software drivers, which correspond to the plurality of respective hardware components, in parallel based at least in part on the plurality of hardware components being a same hardware component type. The first example system further comprises a controller configured to control access of the software drivers to the respective hardware components by serially providing requests from the respective software drivers to the respective hardware components in response to the plurality of software drivers being loaded, the requests requesting initiation of communication with the respective hardware components.

In a first aspect of the first example system, the operating system is further configured to create a designated event to be utilized by the software drivers to facilitate initialization of the respective hardware components. The designated event is usable by one of the software drivers at a time. The designated event forms part of the controller. In accordance with the first aspect, the controller is configured to serially provide the requests during respective periods of time during which the respective software drivers use the designated event.

In an implementation of the first aspect of the first example system, the operating system is configured to remove a static load-time dependency associated with the software drivers to enable the software drivers to be loaded in parallel.

In a second aspect of the first example system, the controller comprises hardware and software. In accordance with the second aspect, the software is configured to generate instructions to program the hardware based at least in part on receipt of the requests from the respective software drivers. In further accordance with the second aspect, the hardware is configured to serially provide the requests to the respective hardware components based at least in part on the instructions. The second aspect of the first example system may be implemented in combination with the first aspect of the first example system, though the example embodiments are not limited in this respect.

In a third aspect of the first example system, the first example system further comprises a plurality of second hardware components. In accordance with the third aspect, the operating system is configured to load a plurality of second software drivers serially to accommodate a static load-time dependency associated with the plurality of second software drivers, the plurality of second software drivers corresponding to the plurality of respective second hardware components. The third aspect of the first example system may be implemented in combination with the first and/or second aspect of the first example system, though the example embodiments are not limited in this respect.

In an implementation of the third aspect of the first example system, a first hardware component type of the plurality of hardware components and a second hardware component type of the plurality of second hardware components are same.

In a fourth aspect of the first example system, the plurality of hardware components is a plurality of respective cameras. In accordance with the fourth aspect, the controller is configured to control the access of the software drivers to the respective cameras by serially providing the requests from the respective software drivers to the respective hardware components. The fourth aspect of the first example system may be implemented in combination with the first, second, and/or third aspect of the first example system, though the example embodiments are not limited in this respect.

In a fifth aspect of the first example system, the first example system further comprises a plurality of second hardware components. In accordance with the fifth aspect, the first example system further comprises a second controller. In further accordance with the fifth aspect, the operating system is further configured to load a plurality of second software drivers, which correspond to the plurality of respective second hardware components, in parallel based at least in part on the plurality of second hardware components being a same second hardware component type. In further accordance with the fifth aspect, the second controller is configured to control access of the second software drivers to the respective second hardware components by serially providing second requests from the respective second software drivers to the respective second hardware components in response to the plurality of second software drivers being loaded, the second requests requesting initiation of communication with the respective second hardware components. In further accordance with the fifth aspect, the controller and the second controller are configured to allow the controller to provide a request from a software driver of the plurality of software drivers to a respective hardware component of the plurality of hardware components in parallel with the second controller providing a second request from a second software driver of the plurality of second software drivers to a respective second hardware component of the plurality of second hardware components. The fifth aspect of the first example system may be implemented in combination with the first, second, third, and/or fourth aspect of the first example system, though the example embodiments are not limited in this respect.

In a first implementation of the fifth aspect of the first example system, the plurality of hardware components are a first hardware component type. In accordance with the first implementation, the plurality of second hardware components are a second hardware component type that is different from the first hardware component type.

In a second implementation of the fifth aspect of the first example system, the operating system is configured to load the plurality of software drivers in parallel with the plurality of second software drivers.

A second example system comprises means for loading a plurality of software drivers, which correspond to a plurality of respective hardware components, in parallel during boot-up of the second example system based at least in part on the plurality of hardware components being a same hardware component type. The second example system further comprises means for controlling access of the software drivers to the respective hardware components by serially providing requests from the respective software drivers to the respective hardware components during the boot-up of the second example system in response to the plurality of software drivers being loaded during the boot-up of the second example system. The requests request initiation of communication with the respective hardware components.

In an example method performed during initialization of a computing device, a plurality of software drivers of the computing device, which correspond to a plurality of respective hardware components of the computing device, are loaded in parallel based at least in part on the hardware components being a same hardware component type. Access of the software drivers to the respective hardware components is controlled by serially providing requests from the respective software drivers to the respective hardware components in response to loading the software drivers. The requests request initiation of communication with the respective hardware components.

In a first aspect of the example method, the example method further comprises removing a static load-time dependency associated with the software drivers to enable the loading of the software drivers in parallel.

In a second aspect of the example method, the example method further comprises creating a designated event to be utilized by the software drivers to facilitate initialization of the respective hardware components. The designated event is usable by one of the software drivers at a time. In accordance with the second aspect, serially providing the requests comprises serially providing the requests during respective periods of time during which the respective software drivers use the designated event. The second aspect of the example method may be implemented in combination with the first aspect of the example method, though the example embodiments are not limited in this respect.

In a third aspect of the example method, serially providing the requests comprises using a controller to serially provide the requests. The controller comprises hardware and software. In accordance with the third aspect, using the controller comprises receiving the requests from the respective software drivers by the software. In further accordance with the third aspect, using the controller further comprises programming the hardware by the software to cause the hardware to serially provide the requests to the respective hardware components. The third aspect of the example method may be implemented in combination with the first and/or second aspect of the example method, though the example embodiments are not limited in this respect.

In a fourth aspect of the example method, the example method further comprises loading a second plurality of software drivers of the computing device serially to accommodate a static load-time dependency associated with the second plurality of software drivers. The fourth aspect of the example method may be implemented in combination with the first, second, and/or third aspect of the example method, though the example embodiments are not limited in this respect.

In an implementation of the fourth aspect of the example method, a first hardware component type of the plurality of hardware components and a second hardware component type of a second plurality of hardware components to which the plurality of respective software drivers correspond are same.

In a fifth aspect of the example method, the plurality of software drivers is a plurality of first software drivers and the plurality of hardware components is a plurality of first hardware components. In accordance with the fifth aspect, controlling the access comprises controlling the access of the first software drivers to the respective first hardware components by a first controller. In further accordance with the fifth aspect, the example method further comprises loading a plurality of second software drivers, which correspond to a plurality of respective second hardware components of the computing device, in parallel based at least in part on the plurality of second hardware components being a same second hardware component type. In further accordance with the fifth aspect, the example method further comprises controlling access of the second software drivers to the respective second hardware components, by a second controller, by serially providing second requests from the respective second software drivers to the respective second hardware components in response to the plurality of second software drivers being loaded, the second requests requesting initiation of communication with the respective second hardware components. In further accordance with the fifth aspect, a request from a specified software driver that is included in the plurality of first software drivers is provided to a specified hardware component that is included in the plurality of first hardware components by the first controller in parallel with a second request from a designated software driver that is included in the plurality of second software drivers being provided to a designated hardware component that is included in the plurality of second hardware components by the second controller. The fifth aspect of the example method may be implemented in combination with the first, second, third, and/or fourth aspect of the example method, though the example embodiments are not limited in this respect.

In a first implementation of the fifth aspect of the example method, the first hardware components are a first hardware component type. In accordance with the first implementation, the second hardware components are a second hardware component type that is different from the first hardware component type.

In a second implementation of the fifth aspect of the example method, the first software drivers are loaded in parallel with the second software drivers.

An example computer program product comprises a computer-readable medium having instructions recorded thereon for enabling a processor-based system to initialize a plurality of hardware components. The instructions comprise first instructions for enabling the processor-based system to load a plurality of software drivers, which correspond to a plurality of respective hardware components, in parallel during boot-up of the processor-based system based at least in part on the plurality of hardware components being a same hardware component type. The instructions further comprise second instructions for enabling the processor-based system to control access of the software drivers to the respective hardware components by serially providing requests from the respective software drivers to the respective hardware components during boot-up of the processor-based system in response to the plurality of software drivers being loaded during the boot-up of the processor-based system. The requests request initiation of communication with the respective hardware components.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
a plurality of hardware components;
a memory storing an operating system;
one or more processors configured to execute the operating system,
the operating system configured to load a plurality of software drivers, which correspond to the plurality of respective hardware components, in parallel based at least in part on the plurality of hardware components being a same hardware component type; and
a computer-readable medium storing instructions that, when executed, cause access of the software drivers to the respective hardware components to be controlled by causing requests to be serially provided from the respective software drivers to the respective hardware components in response to the software drivers being loaded, the requests requesting initiation of communication with the respective hardware components.

2. The system of claim 1, wherein the operating system is further configured to create a designated event to be utilized by the software drivers to facilitate initialization of the respective hardware components, the designated event being useable by one of the software drivers at a time; and
wherein the instructions, when executed, cause the requests to be serially provided during respective periods of time during which the respective software drivers use the designated event.

3. The system of claim 2, wherein the operating system is configured to remove a static load-time dependency associated with the software drivers to enable the software drivers to be loaded in parallel.

4. The system of claim 1, wherein the instructions, when executed, generate second instructions to program circuitry to serially provide the requests to the respective hardware components based at least in part on the second instructions in response to receipt of the requests from the respective software drivers.

5. The system of claim 1, further comprising:
a plurality of second hardware components;
wherein the operating system is configured to load a plurality of second software drivers serially to accommodate a static load-time dependency associated with the plurality of second software drivers, the plurality of second software drivers corresponding to the plurality of respective second hardware components.

6. The system of claim 5, wherein a first hardware component type of the plurality of hardware components and a second hardware component type of the plurality of second hardware components are same.

7. The system of claim 1, wherein the plurality of hardware components is a plurality of respective cameras; and
wherein the instructions, when executed, cause the access of the software drivers to the respective cameras to be controlled by causing the requests to be serially provided from the respective software drivers to the respective cameras.

8. The system of claim 1, further comprising:
a plurality of second hardware components;
wherein the operating system is further configured to load a plurality of second software drivers, which correspond to the plurality of respective second hardware components, in parallel based at least in part on the plurality of second hardware components being a same second hardware component type;
wherein the instructions, when executed, cause access of the second software drivers to the respective second hardware components to be controlled by causing second requests to be serially provided from the respective second software drivers to the respective second hardware components in response to the plurality of second software drivers being loaded, the second requests requesting initiation of communication with the respective second hardware components; and
wherein the instructions, when executed, allow a request from a software driver of the plurality of software drivers to be provided to a respective hardware component of the plurality of hardware components in parallel with a second request from a second software driver of the plurality of second software drivers being provided to a respective second hardware component of the plurality of second hardware components.

9. The system of claim 8, wherein the plurality of hardware components are a first hardware component type; and
wherein the plurality of second hardware components are a second hardware component type that is different from the first hardware component type.

10. The system of claim 8, wherein the operating system is configured to load the plurality of software drivers in parallel with the plurality of second software drivers.

11. A method performed during initialization of a computing device, the method comprising:
loading a plurality of software drivers of the computing device, which correspond to a plurality of respective hardware components of the computing device, in parallel based at least in part on the hardware components being a same hardware component type; and
controlling access of the software drivers to the respective hardware components by serially providing requests from the respective software drivers to the respective hardware components in response to loading the software drivers, the requests requesting initiation of communication with the respective hardware components.

12. The method of claim 11, further comprising:
removing a static load-time dependency associated with the software drivers to enable the loading of the software drivers in parallel.

13. The method of claim 11, further comprising:
creating a designated event that is capable of being assigned to one of the software drivers at a time;
wherein serially providing the requests comprises:
serially providing the requests during respective periods of time during which the designated event is assigned to the respective software drivers.

14. The method of claim 11, wherein serially providing the requests comprises:

receiving the requests from the respective software drivers by the one or more processors; and programming circuitry by the one or more processors to cause the circuitry to serially provide the requests to the respective hardware components.

15. The method of claim 11, further comprising:

loading a second plurality of software drivers of the computing device serially to accommodate a static load-time dependency associated with the second plurality of software drivers.

16. The method of claim 15, wherein a first hardware component type of the plurality of hardware components and a second hardware component type of a second plurality of hardware components to which the plurality of respective software drivers correspond are same.

17. The method of claim 11, wherein the plurality of software drivers is a plurality of first software drivers and the plurality of hardware components is a plurality of first hardware components;

wherein controlling the access comprises:

causing first circuitry to control the access of the first software drivers to the respective first hardware components;

wherein the method further comprises:

loading a plurality of second software drivers of the computing device, which correspond to a plurality of respective second hardware components of the computing device, in parallel based at least in part on the plurality of second hardware components being a same second hardware component type; and causing second circuitry to control access of the second software drivers to the respective second hardware components by causing second requests to be provided from the respective second software drivers to the respective second hardware components in response to the plurality of second software drivers being loaded, the second requests requesting initiation of communication with the respective second hardware components; and wherein a request from a specified software driver that is included in the plurality of first software drivers is caused to be provided to a specified hardware component that is included in the plurality of first hardware components by the first circuitry in parallel with a second request from a designated software driver that is included in the plurality of second software drivers being caused to be provided to a designated hardware component that is included in the plurality of second hardware components by the second circuitry.

18. The method of claim 17, wherein the plurality of first hardware components are a first hardware component type; and wherein the plurality of second hardware components are a second hardware component type that is different from the first hardware component type.

19. The method of claim 17, wherein loading the plurality of first software drivers and loading the plurality of second software drivers are performed in parallel.

20. A system comprising:

memory;

one or more processors coupled to the memory, the one or more processors configured to:

load a plurality of software drivers, which correspond to a plurality of respective hardware components, in parallel during boot-up of the system based at least in part on the plurality of hardware components being a same hardware component type; and a computer-readable medium storing instructions that, when executed, cause access of the software drivers to the respective hardware components to be controlled by causing requests to be serially provided from the respective software drivers to the respective hardware components during the boot-up of the system in response to the plurality of software drivers being loaded during the boot-up of the system, the requests requesting initiation of communication with the respective hardware components.

* * * * *